Aug. 4, 1964
D. A. ANDERSON
3,143,493
SYSTEM AND METHOD FOR MAINTAINING EFFICIENCY
OF SCREENING PARTICLES UNDER VARYING
CONDITIONS OF MOISTURE CONTENT
Filed March 17, 1961
4 Sheets-Sheet 1

Inventor
DONALD ALAN ANDERSON
by: Cavanagh & Norman.

Aug. 4, 1964

D. A. ANDERSON 3,143,493

SYSTEM AND METHOD FOR MAINTAINING EFFICIENCY
OF SCREENING PARTICLES UNDER VARYING
CONDITIONS OF MOISTURE CONTENT

Filed March 17, 1961

*Inventor*

DONALD ALAN ANDERSON by: Cavanagh & Norman

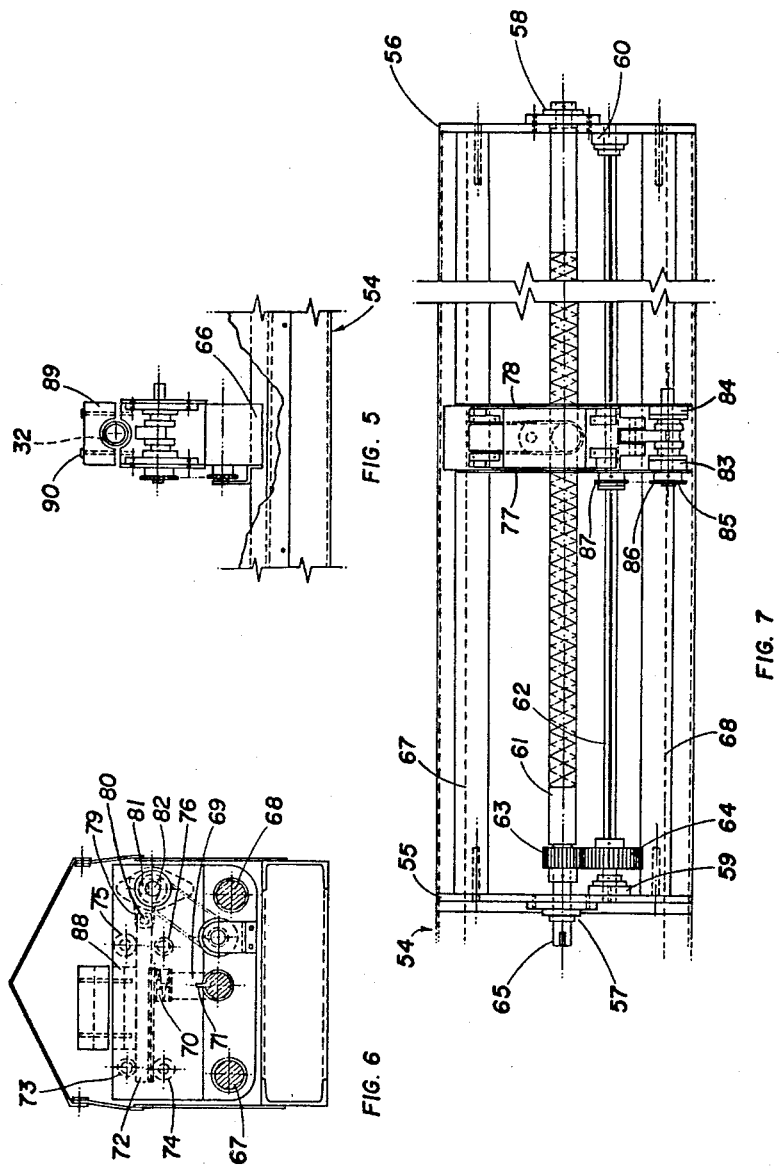

Aug. 4, 1964

D. A. ANDERSON 3,143,493

SYSTEM AND METHOD FOR MAINTAINING EFFICIENCY
OF SCREENING PARTICLES UNDER VARYING
CONDITIONS OF MOISTURE CONTENT

Filed March 17, 1961

Inventor

DONALD ALAN ANDERSON by: *Cavanagh & Norman*

United States Patent Office 3,143,493
Patented Aug. 4, 1964

3,143,493
SYSTEM AND METHOD FOR MAINTAINING EFFICIENCY OF SCREENING PARTICLES UNDER VARYING CONDITIONS OF MOISTURE CONTENT
Donald Alan Anderson, King, Ontario, Canada, assignor, by mesne assignments, to Canadian Ingersoll-Rand Company, Limited, Montreal, Quebec, Canada
Filed Mar. 17, 1961, Ser. No. 96,549
14 Claims. (Cl. 209—238)

This invention relates to a system and method for maintaining efficiency of screening particles under varying conditions of moisture content.

This application is a continuation-in-part of application Serial Number 33,704, filed June 3, 1960, for "Particle Freeing Method and Apparatus for Particle Sizing Screens."

Choking or blinding of particle-sizing screens has been found to occur under extreme conditions, rendering the screening of sand or other like material economically impractical. For example, choking will occur where the humidity in the air is very high, raising the moisture content of the material to be screened to a level at which screening is not economically feasible, due to the fact that certain expedients must be adopted to offset or to remedy the detrimental effects of the humidity.

Heretofore, the commonly used means of clearing the screens has been either to apply a bristle brush to the screen or to vibrate the screen. Both of these means can, of course, be combined to give a more intensive effect. The disadvantage of clearing screens by devices which come into direct contact with the sand and stone being processed is that the larger, coarser particles, in being displaced along the screen to a point of ultimate discharge, carry masses of smaller, finer particles which adhere to the surfaces of the coaser particles. There is, therefore, inherent in such clearing techniques, an attendant considerable loss of sand. It is well to point out that such conditions have also been found to obtain in the screening of ores by comparable methods. Brushing techniques, then, contribute significantly to the natural tendency of finer particles to cling to larger, coarser particles.

Furthermore, it has been found that when the apparatus of the instant invention is operated in an excessively dry climate, or is applied to material with a moisture content of less than about 7%, the material has a definite tendency to bake or to dry onto the screen thereby to cause choking or blinding of the screen and to disrupt the screening operation.

It is therefore the main object of this invention to provide a system and method for maintaining efficient screening of particles under varying conditions of humidity, temperature and moisture content.

It is a further object of the invention to provide a method and apparatus for clearing choked screens, whereby finer particles are not moved into closer physical association with coarser particles, and whereby the bridging characteristics of finer particles, described hereinafter, are destroyed continuously during screening operations.

It is a further object of the invention to provide apparatus for clearing screening which may be utilized with various types of known screening apparatus in either single or multiple arrangement.

Other objects of the invention will be appreciated from a consideration of the following specification taken in conjunction with the accompanying drawings, in which:

FIGURE 5 is an end elevation of a modified form of actuating structure for the air tube of the invention in which the air tube is given both an axial and lateral motion;

FIGURE 6 is a section on the line 6—6 of FIGURE 5;

FIGURE 7 is a plan view of the structural detail of FIGURE 5;

Figure 1:
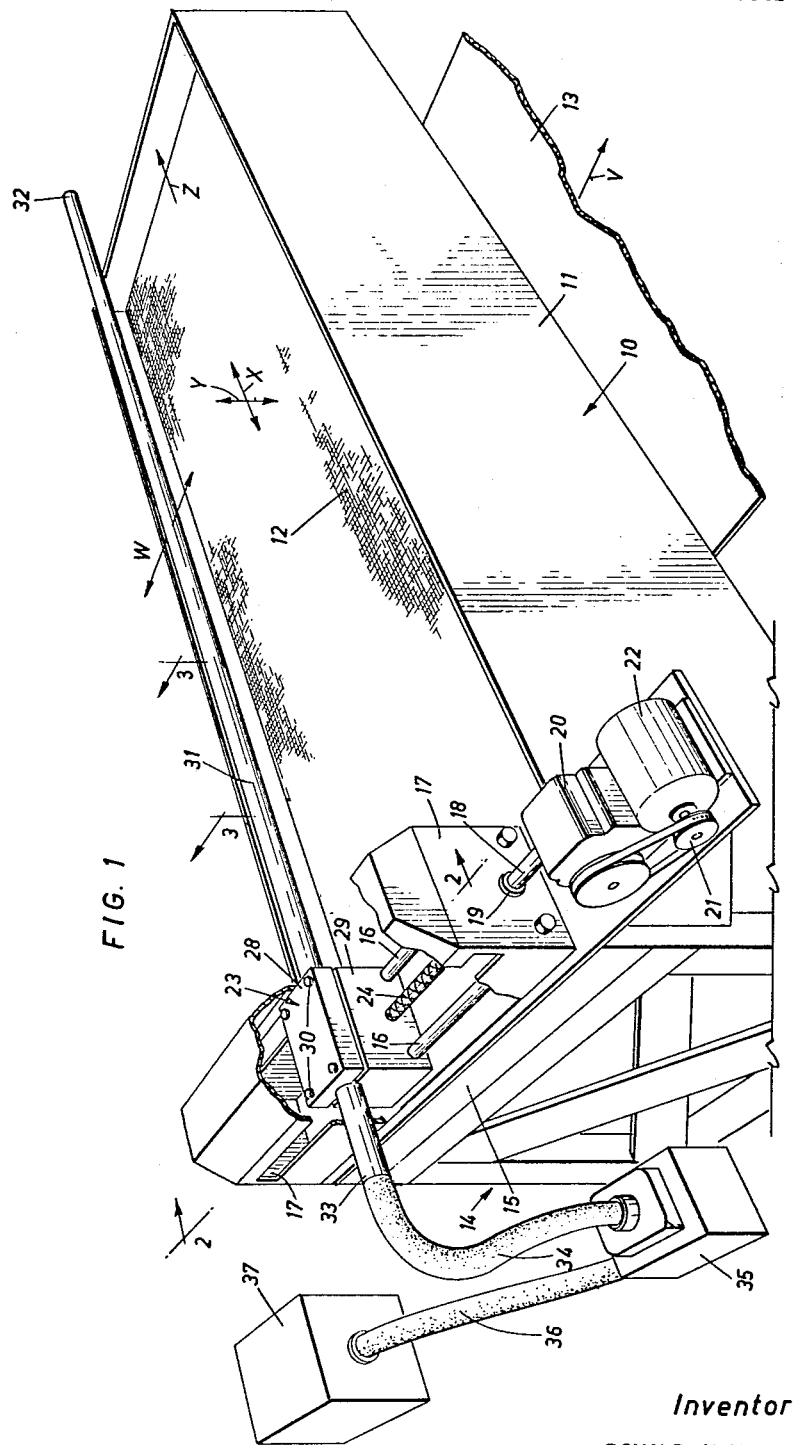
FIGURE 1 is a perspective view of apparatus of the invention as applied to one simple form of material-sizing screen.

Referring to the drawings, a vibrating screen structure 10 having a frame part 11 is shown in FIGURE 1 in simplified form. Screen element 12 is adapted to vibrate longitudinally as well as vertically in the directions of the arrows "X" and "Y" respectively, the screen being sloped downwardly toward the discharge end in order that coarse particles will be discharged in the direction of the arrow "Z" therefrom. The finer particles descend through the openings in the screen and are conveyed therefrom to a point of utilization by conveyor belt 13 moving in the direction of the arrow "V." The invention may be applied to any one of a variety of arrangements of screens for the purpose of freeing material bridging the screen openings.

The bridging of screen openings by fine particles arises from their inherent tendency to cling together, which tendency is amplified by the surface tension of a wet film extending over one or more particles in a particular mass. Under certain conditions, depending upon the surface smoothness of individual particles, a relatively small amount of moisture may cause a clinging condition to develop, whereby a group of particles may together establish a self- supporting arch configuration across a screen opening. The disturbance of this arch configuration readily effects its collapse. It is essential that the moisture content of the bridging mass be reduced, provided that some of the constituent particles are disturbed. As the same time, it is to be borne in mind that the moisture content of the material, for ideal screening efficiency, is not to be reduced below a critical value, which has been found to be of the rate of 7% for most materials. Substantial improvement is achieved in most instances by reducing the moisture content even slightly, since, in the nature of the thin films of moisture, it is only necessary that minute quantities of water be removed in order to render critical areas sufficiently free of moisture to destroy the inherent surface tension characteristics of the film without which the arch configuration can no longer remain self-supporting. Accordingly, extensive bridging conditions over a screen may be substantially destroyed by the removal of rather small amounts of water. In this regard, it has been found that the circulation of air is beneficial where the existing humidity conditions are just sufficient to set up bridging conditions.

It has heretofore been the practice, where the material to be screened is substantially saturated with moisture, to apply further physical means such as brushes, either alone or in combination with physical vibrations of various frequencies. According to the instant invention, however, it has been found that the utilization of a plurality of air jets in a continuous traverse of the screen area enables a critical reduction in surface moisture and provides pressure upon the particle bridges sufficient to bring about their collapse. Through such means, continuous screening operation under the most severe conditions has been made possible without at the same time adding appreciably to the operating costs.

It has heretofore been virtually impossible to conduct satisfactory screening operations in the late fall and winter months due to the fact that moisture contained in the material tends to freeze. The invention provides a solution to this problem by providing, as modification of the invention, means for heating the air blown through the jets. This feature is not essential to the reduction of surface moisture, but rather for the elimination of frost which may be present. The mass, once free of frost, will be accommodated through a screen element having applied thereto the air jet system of the invention, despite the aforesaid tendency of the finer particles to block the screen openings by setting up bridges thereacross.

In FIGURE 1, the screen structure 10 carries in association therewith an attachable frame 14 supporting a traversing head base 15 supporting guide bars 16 affixed to end plates 17. A rotatable shaft 18 is journalled in end plates 17 and bearings 19 and extends beyond one end plate for drive action within reduction gear box 20 and driven, in turn, by drive means 21 which said drive means is preferably in the form of an electric motor 22. Drive shaft 18 is operatively connected to traversing head 23 in a manner providing a continuous, lateral back-and-forth motion of the traversing head.

Figure 2:
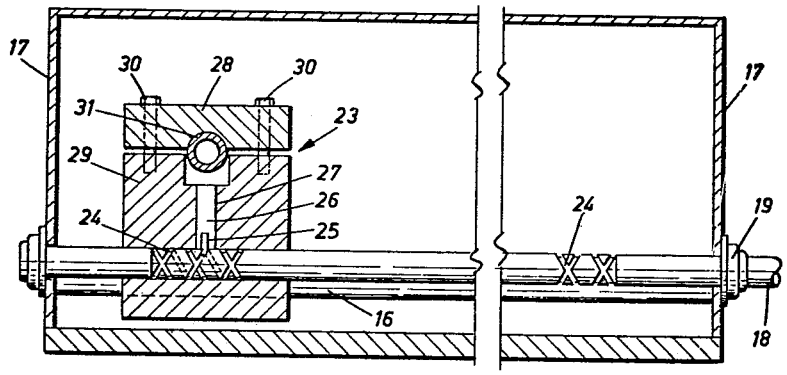
FIGURE 2 is a sectional view on the line 2—2 of FIGURE 1.

In the preferred form of the invention, shaft 18 embodies a continuous reversing helical groove 24 extending beyond end plates 17 which, as shown in FIGURE 2, accommodates a drive pin 25 slidably therein under pressure of spring 26 in bore 27 of the lateral traversing head 23.

The traversing head 23 embodies a removable head block 28 fastened to the body 29 by means of removable bolts 30. Head block 28 and body 29 are adapted to clamp therebetween a longitudinally extending forwardly projecting screen traversing bar 31 of tubular construction, the bore thereof being closed at its outer end 32 and connected at its inner end 33 to a flexible tube 34 communicating from a heater 35, which may be of any well known air heat exchange type and which latter in turn communicates by line 36 with an air pump 37 of suitable type.

Figure 3:
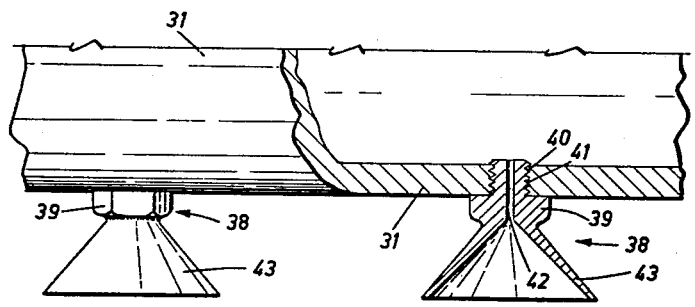
FIGURE 3 is a sectional view of a portion of the traversing head taken on the line 3—3 of FIGURE 1.

The traversing bar 31 of the invention is shown in substantial detail in FIGURE 3. Air jet nozzles 38 are disposed along the bar at a preferred spacing of about two bar diameters. Each jet nozzle comprises a hexagonal base portion 39 which embodies a threaded portion 40 which engages a threaded bore 31 in the bar, a central nozzle opening 42 of substantially 1/16" diameter, and an integrally formed conical structure 43 diverging from nozzle opening 42 at a sidewall angle of about 45°, so that the angle included between the sidewalls of the conical structure 43 is about 90°. Structure 43 serves additionally as a protective skirt for nozzle opening 42.

In operation, traversing bar 31 moves continuously, traversing screen 12 in the direction of the arrow "W" and in a plane parallel with that of screen 12. The air jet streams project downwardly from the nozzles into the screen elements 12 and diverge to cover effectively the entire screen area throughout the length of the bar and over a width corresponding to about two bar diameters, when traversing bar 31 is supported a distance of about two bar diameters above the screen which has been found to be substantially ideal positioning of the bar. Traversing bar 31 thus effects continuous scanning of the screen surface and serves to disrupt the bridging action of the finer particles, both by the pressure exerted by the jet air streams and by the rather slight, but highly effective, evaporating action of the air upon the thin moisture films clinging to the particles.

The disclosure of an air heater herein is made solely for the purpose of providing means for removing frost. It is not an object of the invention to effect drying of the particles by the application of heat. The heating required to dry the particles sufficiently would, in most cases, be excessive and consequently uneconomical. It is intended therefore that heating be used in the invention only for the purpose of removing frost from the particles as a preliminary step of the operation. By this expedient, the invention successfully overcomes frost conditions would would otherwise render the scanning practice inoperative in early spring and late fall in Canada and the northern United States. Furthermore, the invention constitutes a departure from the reduction of moisture content by flame-heat drying methods or the like which are generally regarded as uneconomical and are practised only where no other method of operation is available.

Figure 4:
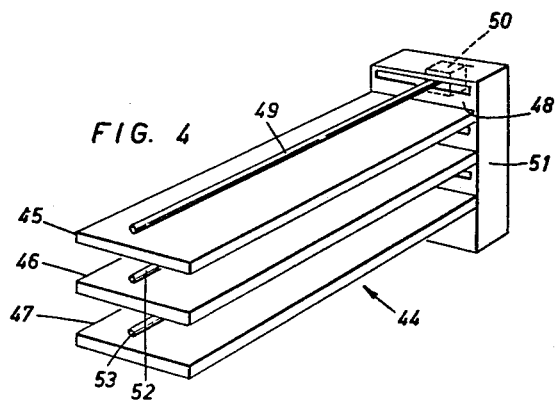
FIGURE 4 is a perspective view illustrating the application of the apparatus of the invention to multi-deck vibrating screens.

The application of the invention in multiple form is illustrated in FIGURE 4, wherein the triple deck screen structure 44, having vibrating screen decks 45, 46 and 47 disposed in any suitable sloped configuration, has applied, at the upper end 48 thereof, a lateral screen or traversing bar structure 49 of the invention, actuated by a driven mechanism 50 of the kind described hereinbefore. The frame 51 of the driving structure may be adapted to support additional scanning bars 52 and 53 of the invention. It will be observed that the comparatively small diameter of the scanning bar in each case, and its continuous lateral reciprocal motion, avoid passage of material from one screen to a lower screen and render the invention applicable to a great variety of screen combinations conventionally used.

A modified form of the invention is illustrated in FIGURES 5, 6 and 7, in which air tube 32 may be given an axial reciprocal motion as it traverses the screen in its lateral sweeping action. In the modified structure shown, frame structure 54 supports end plates 55 and 56 carrying bearings 57, 58, 59 and 60 therein, and mounting a two-directional helical groove shaft 61 and a spline shaft 62 driven by shaft 61 through gearing 63 and 64. Shaft 61 is connected by its projection 65 to suitable driving means such as the drive mechanism 20, 21 and 22 of FIGURE 1. A laterally moving carrier member 66 slidably travels on stationary shaft or guide rods 67 and 68. A pin 69 biased by spring means 70 rides on shaft 61 and embodies a stud pin 71 which articulates within the helical groove of shaft 61 to effect lateral motion of carrier 66 upon movement of shaft 61. Carrier member 66 embodies a forwardly and rearwardly slidable reciprocating plate 72, movable between guide rollers 73, 74, 75 and 76 supported by side plates 77 and 78 extending upwardly from frame structure 54 to carrier member 66. Reciprocating plate 72 is actuated by crank arm 79, pivoted as at 80 and extending rearwardly for connection with eccentric crank pin 81 rotated about support shaft 82 supported on bearings 83 and 84 on side plates 77 and 78, and extending to mount the sprocket 85, driven by chain 86 connecting with chain drive sprocket 87 slidably keyed onto spline shaft 62 and movable therealong with the carrier.

Reciprocating plate 72 carries pipe clamp base 88 rigidly fastened thereto, and is adapted to carry a removable clamp part 89 fastened thereto by means of suitable bolts 90, thus to clamp pipe 32, indicated therein in chain lines.

It will be apparent that as carrier member 66 moves laterally, crank 79 imparts a forwardly and rearwardly reciprocating motion to clamps 88 and 89. Each jet of air from tube 32 thus traces a path of generally sine wave form and of predetermined width defined by the reciprocating stroke, resulting in a band of material across the width of the screen being subjected to air agitation. The longitudinal spacing of air jets along the air tube may be adjusted such that the band-like or strip-like areas of agitated materials just described may be slightly overlapping, if preferred.

It has been found that the modified form of the invention, as illustrated in FIGURES 5, 6 and 7, enables superior performance to be realized with pit sands in various localities on dry days as well as under conditions of high humidity. The axial reciprocation of the air tube produces a coverage by the air streams far beyond that effected by the more simplified form of apparatus described with reference to FIGURES 1, 2, 3 and 4. The axial reciprocity feature proposed as a modification herein, while not an essential element of the invention, is nevertheless of very great benefit when working under conditions which would otherwise be deemed to render scanning practice impossible, such as, for example, with materials which have been pre-dried and yet tend to bridge on the screen. Another unexpected result of the modification disclosed is that it greatly improves the material-stripping characteristics of the apparatus of the invention, thereby providing a substantially uniform layer of material during the operation and further increasing the screening efficiency. Much higher screening capacities are therefore made possible by the apparatus, system and method of the invention, even over capacities formerly achieved with ideal material.

Figure 8:
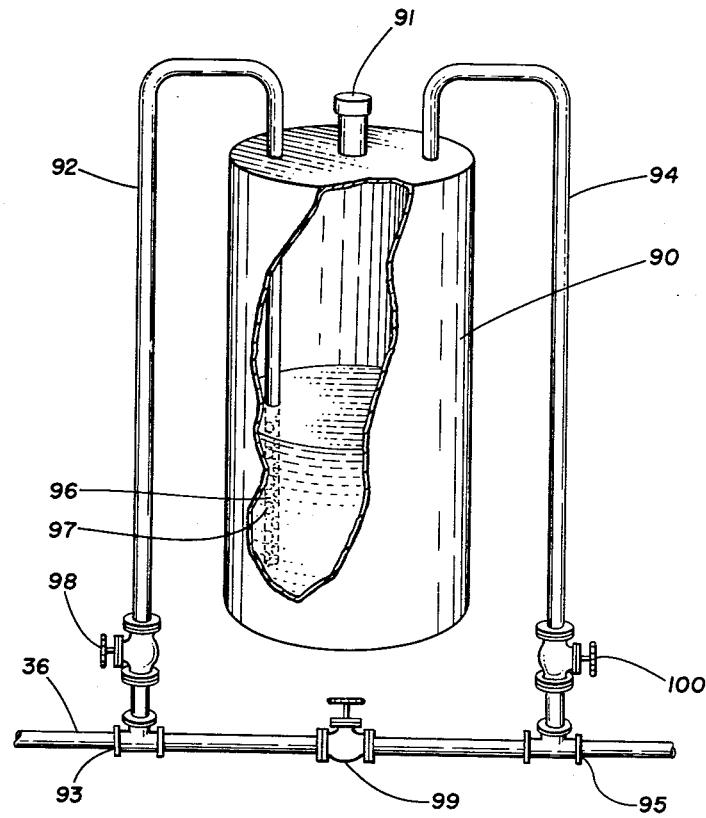
FIGURE 8 is a perspective view of the humidifier system apparatus of the invention.
Figure 9:
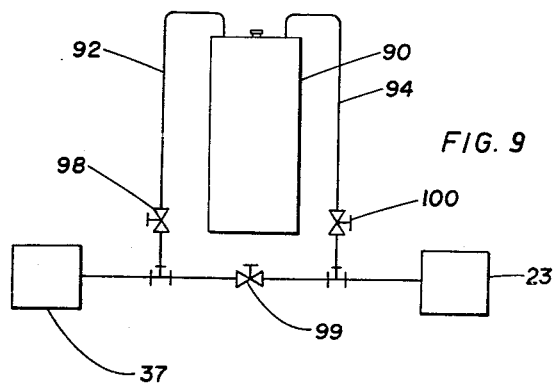
FIGURE 9 is a diagrammatic view of the system showing the location of the humidifier system apparatus.

As mentioned hereinbefore, clogging or choking of the particle sizing screen has been found to occur under conditions of extreme dryness, as well as under conditions of excessive humidity. Accordingly, a humidifier system has been incorporated into the invention, as depicted in FIGURE 8 in which numeral 90 designates the substantially cylindrical humidifier tank of the invention, provided with fill plug 91. Humidifier tank 90 is connectible by suitable inlet piping 92 to line 36 from air pump 37 as at 93, and by suitable outlet piping 94 as at 95. Numeral 96 designates the bubbler pipe of the system, in which suitably disposed holes 97 are drilled so that incoming air can be bubbled through the water contained in the tank. Suitably positioned valves 98, 99 and 100 are provided in the humidifier apparatus such that the percentage of air to be circulated through the system can be varied as desired.

In practice, it has been found that with materials having a natural moisture content of 7% and above, the drying effect of the air streams projected upon the material from the air jet nozzles of the invention will not dry the material to the extent that clogging or choking arises. Similarly, when the natural humidity of the atmosphere is high, the drying effect of the air streams will not suffice to cause clogging or choking of the screen. Under either of these conditions, the humidifier system would be disconnected, i.e., valves 98 and 100 would be shut and valve 99 would be completely opened, providing free passage of the air from the air pump or compressor 37. On the other hand, with materials having a natural moisture content of less than about 7%, or where the atmosphere is excessively dry, it has been found that the jet air streams of the invention tend to have an instantaneous drying effect upon the material being processed, such that the material tends to bake onto the screen and to set up clogging or choking conditions. Under these circumstances, it has been found that by increasing the humidity in the air being supplied to the air jet nozzles of the invention, it has been possible to eliminate substantially all choking or clogging effects. To provide humidification of the air, valves 98 and 100 are opened and the opening of valve 99 is adjusted such that the desired proportion of air is diverted through humidifier tank 90.

It is to be understood that the disclosure of the humidifier apparatus shown in FIGURE 8 is merely for illustrative purposes and it is contemplated that any suitable means for effectively controlling the moisture content of the air supplied to the air tube might be employed without departing from the scope of the invention.

As shown in FIGURE 9, the humidifier system of the invention is located intermediate of the air pump or compressor 37 and the traversing head 23, suitable connecting means 101 and 102 being provided to connect the system to the line 36. It will be appreciated that under normal conditions, the air pump or compressor 37 will provide sufficient heat to the air being supplied. However, where additional heat is required, and where the apparatus is being operated under conditions requiring the use of the humidifier system, it will be appreciated that the heater 35 will be located intermediate of the compressor 37 and the humidifier system.

It will therefore be appreciated that an apparatus has been provided, as described hereinbefore, which is operable to provide screening of virtually all materials under varying conditions of temperature, humidity and moisture content.

It is intended that the present disclosure should not be construed in any limiting sense other than that indicated by the scope of the following claims having regard to the state of the prior art.

What I claim is:

1. The method of freeing particles bridging the openings in a particle sizing screen and comprising: establishing an air jet stream zone of strip like area configuration over said screen and projecting air under pressure in said zone toward said screen to disrupt bridged particles thereon and to effect clearing of said screen under said zone; laterally moving said zone over said screen continuously and reciprocably to effect continuous scanning of the entire area of said screen by jet streams of air; and moving said zone substantially parallel to said screen and substantially at right angles to said lateral motion whereby each jet stream establishes a substantially sinusoidal path over said screen.

2. Apparatus for freeing particles bridging the openings in particle sizing screens having lateral dimensions of length and width and comprising: a laterally movable traversing head; means slidably supporting said head and mountable in association with a screen to locate said head for motion parallel to a lateral dimension of said screen; drive means reciprocably moving said head laterally; carrier means on said traversing head movable relative thereto in a direction substantially normal to the lateral motion thereof; reciprocable motion generating means connected to said carrier means for imparting motion thereto simultaneously with the movement of said traversing head thereby generating a substantially sinusoidal path of motion for said carrier means; and air tube connected to said carrier means and projecting rigidly therefrom over said screen; air pumping means for supplying air under pressure to the interior of said tube; and a plurality of air jet nozzle means in said tube communicating air therefrom substantially perpendicularly toward said screen.

3. Apparatus for freeing particles bridging the openings in particle sizing screens having lateral dimensions of length and width and comprising: a laterally movable traversing head; means slidably supporting said head and mountable in association with a screen to locate said head for motion parallel to a lateral dimension of said screen; drive means reciprocably moving said head laterally; carrier means on said traversing head movable relative thereto in a direction substantially normal to the lateral motion thereof; reciprocable motion generating means connected to said carrier means for imparting motion thereto simultaneously with the movement of said traversing head thereby generating a substantially sinusoidal path of motion for said carrier means; an air tube connected to said carrier means and projecting rigidly therefrom over said screen; air pumping means for supplying air under pressure to the interior of said tube; a plurality of air jet nozzle means in said tube communicating air therefrom substantially perpendicularly toward said screen; said nozzle means being spaced one from another along the length of said tube a distance substantially equal to the distance of said nozzle means from said screen; and a frusto-conical skirt portion on each said nozzle means to direct a continuously diverging air pressure front to said screen whereby the bridging characteristics of particles on said screen is destroyed with each complete scan of said tube by said screen.

4. Apparatus for freeing particles bridging the openings in particle sizing screens having lateral dimensions of length and width and comprising: a laterally movable traversing head; means slidably supporting said head and mountable in association with a screen to locate said head for motion parallel to a lateral dimension of said screen; drive means reciprocably moving said head laterally; carrier means on said traversing head movable relative thereto in a direction substantially normal to the lateral motion thereof; reciprocable motion generating means connected to said carrier means for imparting motion thereto simultaneously with the movement of said traversing head thereby generating a substantially sinusoidal path of motion for said carrier means; an air tube connected to said carrier means and projecting rigidly therefrom over said screen; air pumping means for supplying air under pressure to the interior of said tube; a plurality of air jet nozzle means in said tube communicating air therefrom substantially perpendicularly toward said screen; said nozzle means being spaced one from another along the length of said tube a distance substantially equal to the distance of said nozzle means from said screen; a frusto-conical skirt portion on each said nozzle means to direct a continuously diverging air pressure front to said screen whereby the bridging characteristic of particles on said screen is destroyed with each complete scan of said screen by said tube; and means for adding heat energy to said air thereby rendering said apparatus effective for removing frost from particles on a screen.

5. The method of increasing the throughput of particles on a particle sizing screen and comprising: loading said particles onto said screen; establishing a plurality of air jet streams spaced apart from one another located at a distance above said screen substantially equal to the distance separating adjacent said jet streams and directed on parallel axes substantially normal to said screen and diverging outwardly at an angle of about thirty degrees from said axis to define substantially conical shaped paths; continuously traversing said air jet streams over said screen to effect continuous scanning of the entire area of said screen by said jet streams and to accelerate passage of the smaller of said particles through said screen while continually disturbing the larger said particles retained thereby; changing the direction of said traversing motion of said air jet streams while the same are in traversing motion as aforesaid; and, removing said retained particles.

6. The method of increasing the throughput of particles on a particle sizing screen and comprising: loading said particles onto said screen; establishing a plurality of air jet streams spaced apart from one another at a distance above said screen subtantially equal to the distance separating adjacent said jet streams and directed on parallel axes substantially normal to said screen and diverging outwardly at an angle of about thirty degrees from said axes to define substantially conical shaped paths; heating said air jet streams; continuously traversing said air jet streams over said screen to effect continuous scanning of the entire area of said screen by said jet streams and to accelerate passage of the smaller of said particles through said screen while continually disturbing the larger said particles retained thereby changing the directions of said traversing motion of said air jet streams while the same are in traversing motion as aforesaid, and, removing said retained particles.

7. The method as claimed in claim 1 wherein said air projected in said air jet stream zone is directed on a path substantially normal to said screen.

8. Apparatus for freeing particles bridging the openings in particle sizing screens having lateral dimensions of length and width and comprising: a laterally movable traversing head; means slidably supporting said head and mountable in association with a screen to locate said head for motion parallel to a lateral dimension of said screen; drive means reciprocably moving said head laterally: an air tube projecting rigidly from said traversing head over said screen and at a distance therefrom of about two diameters of said air tube; an air pump for supporting air under pressure to the interior of said tube; a plurality of air jet nozzle means in said tube communicating air therefrom substantially perpendicularly towards said screen and spaced one from the other along said tube a distance substantially equal to two diameters of said air tube; and, a diverging mouth portion of frusto-conical shape fastened to each said nozzle means and constituting a diverging endwise extension thereof defining a continuously diverging air pressure path onto said screen to procure overlapping of adjacent said paths.

9. Apparatus for freeing particles bridging the openings in particle sizing screens having lateral dimensions of length and width and comprising: a laterally movable traversing head; means slidably supporting said head and mountable in association with a screen to locate said head for motion parallel to a lateral dimension of said screen; drive means reciprocably moving said head laterally; an air tube projecting rigidly from said traversing head over said screen and at a distance therefrom of about two diameters of said air tube; an air pump for supporting air under pressure to the interior of said tube; a plurality of air jet nozzle means in said tube communicating air therefrom substantially perpendicularly towards said screen and spaced one from the other along said tube a distance substantially equal to two diameters of said air tube; a diverging mouth portion of frusto-conical shape fastened to each said nozzle means and consitituting a diverging endwise extension thereof defining a continuously diverging air pressure path onto said screen to procure overlapping of adjacent said paths, and means heating said air prior to discharge from said nozzle means to melt frost on said particles.

10. The method as claimed in claim 1 including the step of adding moisture to said air jet streams.

11. The method as claimed in claim 5 including the step of adding moisture to said air jet streams.

12. Apparatus as claimed in claim 2 including humidifier means connected between said air tube and said pumping means.

13. Apparatus as claimed in claim 4 including humidifier means connected between said air tube and said pumping means.

14. Apparatus as claimed in claim 8 including humidifier means connected between said air tube and said pumping means.

References Cited in the file of this patent

UNITED STATES PATENTS

| | | |
|---|---|---|
| 314,137 | Kennedy | Mar. 17, 1885 |
| 533,457 | Guchel | Feb. 5, 1895 |
| 618,615 | Prinz | Jan. 31, 1899 |
| 619,257 | Judd | Feb. 7, 1899 |
| 1,153,804 | McKinlay | Sept. 14, 1915 |
| 1,919,201 | Clements | July 25, 1933 |
| 2,129,214 | Hopkins | Sept. 6, 1934 |
| 2,544,616 | Sartorius | Mar. 6, 1951 |
| 2,833,412 | Ahlmann | May 6, 1958 |

FOREIGN PATENTS

| | | |
|---|---|---|
| 110,773 | Sweden | May 30, 1944 |

OTHER REFERENCES

Chemical Engineering, volume 65, page 176, Sept. 22, 1958.

Germany, Printed Application, 16,186 III/45e, Sept. 6, 1956.